(12) United States Patent
Moon et al.

(10) Patent No.: US 10,346,090 B2
(45) Date of Patent: Jul. 9, 2019

(54) MEMORY CONTROLLER, MEMORY BUFFER CHIP AND MEMORY SYSTEM

(71) Applicant: SK hynix Inc., Icheon-si, Gyeonggi-do (KR)

(72) Inventors: Young-Suk Moon, Yongin-si (KR); Hong-Sik Kim, Seongnam-si (KR)

(73) Assignee: SK hynix Inc., Icheon-si, Gyeonggi-do (KR)

(*) Notice: Subject to any disclaimer, the term of this patent is extended or adjusted under 35 U.S.C. 154(b) by 230 days.

(21) Appl. No.: 15/287,917

(22) Filed: Oct. 7, 2016

(65) Prior Publication Data
US 2018/0004446 A1   Jan. 4, 2018

(30) Foreign Application Priority Data
Jun. 30, 2016 (KR) .......................... 10-2016-0082225

(51) Int. Cl.
*G06F 3/06* (2006.01)
*G06F 13/16* (2006.01)

(52) U.S. Cl.
CPC .......... *G06F 3/0659* (2013.01); *G06F 3/0611* (2013.01); *G06F 3/0688* (2013.01); *G06F 13/1657* (2013.01); *G06F 13/1673* (2013.01)

(58) Field of Classification Search
CPC .... G06F 3/0659; G06F 12/00; G06F 13/1673; G06F 13/1689; G06F 3/061; G06F 3/0656; G06F 13/1668; G06F 13/1678; G06F 13/1684
See application file for complete search history.

(56) References Cited

U.S. PATENT DOCUMENTS

| | | | |
|---|---|---|---|
| 7,925,824 B2 | 4/2011 | Brittain et al. | |
| 8,086,815 B2 | 12/2011 | Jeddeloh et al. | |
| 2008/0140724 A1* | 6/2008 | Flynn | .............. G06F 3/0613 |
| 2017/0031592 A1* | 2/2017 | More | .............. G06F 3/061 |

* cited by examiner

*Primary Examiner* — Reginald G Bragdon
*Assistant Examiner* — Thanh D Vo
(74) *Attorney, Agent, or Firm* — William Park & Associates Ltd.

(57) ABSTRACT

A memory system may be provided. The memory system may include a memory buffer chip coupled to one or more memory chips. The memory system may include a memory controller configured to control the memory buffer chip to input/output data to/from the one or two or more memory chips. The memory buffer chip may include a first interface configured to transmit/receive a signal to/from the memory controller. The memory buffer chip may include a second interface configured to transmit/receive a signal to/from the memory chip. The memory buffer chip may include a command buffer configured to buffer commands received from the memory controller through the first interface. The memory buffer chip may include a read buffer configured to buffer read data received from the memory chip.

9 Claims, 11 Drawing Sheets

MEMORY CONTROLLER, MEMORY BUFFER CHIP AND MEMORY SYSTEM

CROSS-REFERENCE TO RELATED APPLICATIONS

The present application claims priority of Korean Patent Application No. 10-2016-0082225, filed on Jun. 30, 2016, which is incorporated herein by reference in its entirety.

BACKGROUND

1. Technical Field

Various examples of embodiments may generally relate to a memory system including a memory controller and a memory buffer chip, and more particularly, to a memory controller, a memory buffer chip, a memory system, and method of operating or controlling the same.

2. Related Art

Figure 1:
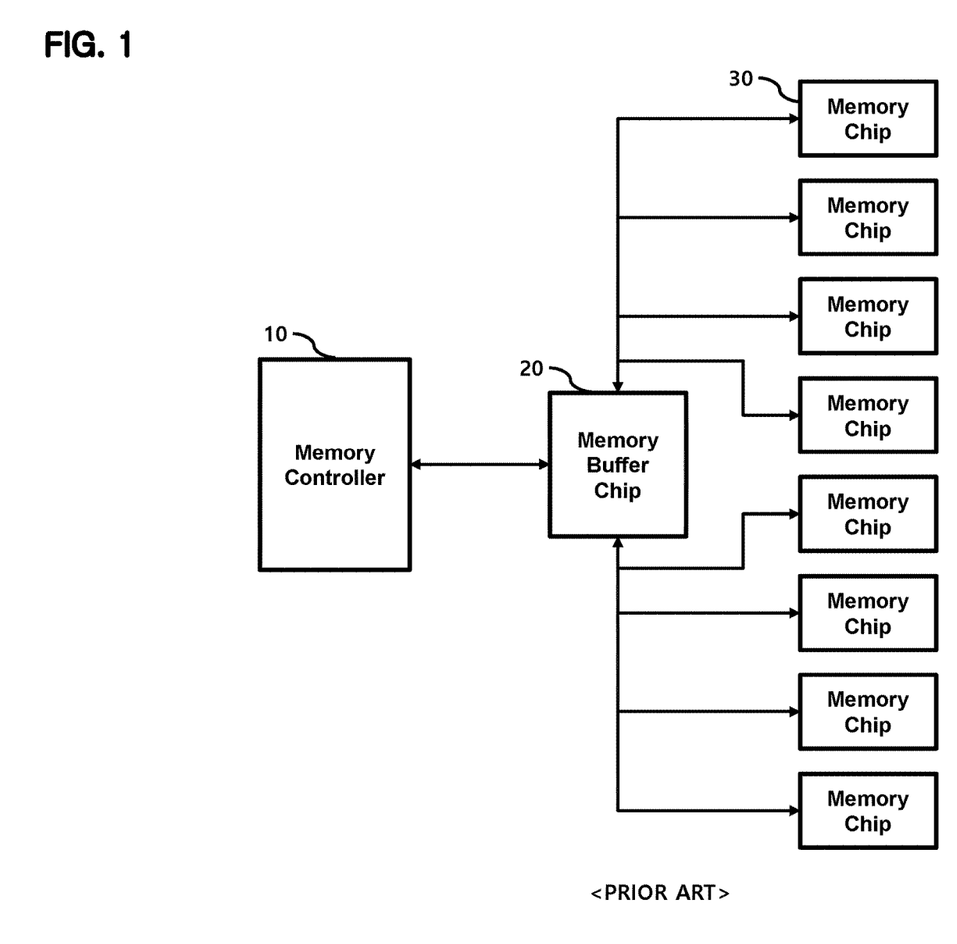
FIG. 1 is a block diagram illustrating a conventional memory system.

FIG. 1 is a block diagram illustrating a conventional memory system.

The conventional memory system consists of a memory controller 10, a memory buffer chip 20 and a plurality of memory chips 30.

The memory buffer chip 20 and the plurality of memory chips 30 may be included in one memory module.

The conventional memory system consists of the memory buffer chip 20 which is installed between the memory controller 10 and the memory chips 30 in order to improve the signal quality, when a plurality ranks RANK are coupled to one channel.

The memory buffer chip 20 buffers a command/address/data.

In general, the synchronous interface technology is used to simplify design. According to the synchronous interface technology, an operating frequency between the memory controller 10 and the memory buffer chip 20 is equal to an operating frequency between the memory buffer chip 20 and the memory chip 30.

However, the two frequencies may not be equal to each other due to various reasons. For example, when a high capacity is intended to be implemented at one channel, the two frequencies may be different from each other.

In addition, when the number of ranks coupled to one channel is increased, speed degradation may occur to cause a difference between the operating frequencies.

Furthermore, a memory chip with a low operating frequency may be intentionally used for the yield or low power consumption.

Moreover, when speed provided by a new type of memory chip has a limit, a difference may occur between the operating frequencies.

As such, the two operating frequencies may have a difference therebetween due to various reasons. In order to compensate for a difference between the operating frequencies while maintaining the synchronous interface technology, the level of difficulty in the overall design of the memory system inevitably increases. For example, the memory controller must be designed to correct a timing parameter.

Therefore, there is a demand for a new memory system which does not raise the level of difficulty in design even though a difference occurs between operating frequencies.

SUMMARY

In an embodiment, there may be provided a memory controller. In an embodiment, there may be provided a memory buffer chip. In an embodiment, there may be provided a memory system. In an embodiment, there may be provided a method of operating a memory buffer chip. In an embodiment, there may be provided a method of controlling a memory buffer chip. The memory system may include a memory buffer chip coupled to one or more memory chips. The memory system may include a memory controller configured to control the memory buffer chip to input/output data to/from the one or two or more memory chips. The memory buffer chip may include a first interface configured to transmit/receive a signal to/from the memory controller. The memory buffer chip may include a second interface configured to transmit/receive a signal to/from the memory chip. The memory buffer chip may include a command buffer configured to buffer commands received from the memory controller through the first interface. The memory buffer chip may include a read buffer configured to buffer read data received from the memory chip.

In an embodiment, a memory controller which controls a memory buffer chip coupled to one or two or more memory chips may include: a command generation unit configured to generate a command which is provided to the memory buffer chip; a data buffer configured to store data which are to be transmitted to or received from the memory buffer chip; a register configured to store command credit information which is reset according to the size of a command buffer of the memory buffer chip; and a control unit configured to control the register according to a command credit update signal received from the memory buffer chip, wherein the command generation unit determines whether to output the command to the memory buffer chip according to the command credit information.

In an embodiment, a memory buffer chip which is positioned between a memory controller and one or two or more memory chips may include: a first interface configured to transmit/receive a signal to/from the memory controller; a second interface configured to transmit/receive a signal to/from the memory chip; a command buffer configured to buffer commands received from the memory controller through the first interface; and a read buffer configured to buffer read data received from the memory chip, wherein when there occurs a first event that transmits one of the commands stored in the command buffer to the memory chip through the second interface, the command buffer informs the memory controller of the first event through the first interface.

In an embodiment, a memory system may include: a memory buffer chip coupled to one or two or more memory chips; and a memory controller configured to control the memory buffer chip to input/output data to/from the one or two or more memory chips. The memory buffer chip may include: a first interface configured to transmit/receive a signal to/from the memory controller; a second interface configured to transmit/receive a signal to/from the memory chip; a command buffer configured to buffer commands received from the memory controller through the first interface; and a read buffer configured to buffer read data received from the memory chip, and the memory controller may output a command to the memory buffer chip when the command buffer has a space or the read buffer stores data.

In an embodiment, a method of controlling a memory buffer chip coupled to one or more memory chips with a memory controller may comprise generating a command, with a command generation unit, and providing the command to the memory buffer chip; storing data, with a data buffer, that is to be transmitted to or received from the memory buffer chip; storing command credit information, with a register, which is reset according to a size of a command buffer of the memory buffer chip; controlling the register, with a control unit, according to a command credit update signal received from the memory buffer chip; and wherein the command generation unit determines whether to output the command to the memory buffer chip according to the command credit information.

In an embodiment, a method of operating a memory buffer chip which is positioned between a memory controller and one or more memory chips may comprise transmitting and receiving, with a first interface, a signal to and from the memory controller; transmitting and receiving, with a second interface, a signal to and from the memory chip; buffering commands received from the memory controller through the first interface with a command buffer; and buffering read data received from the memory chip with a read buffer, wherein based on a first event occurring, the command buffer informs the memory controller of the first event through the first interface, and wherein the first event includes transmitting one of the commands stored in the command buffer to the memory chip through the second interface.

DETAILED DESCRIPTION

Various embodiments will be described below with reference to the accompanying drawings.

Various embodiments may be directed to a technology for solving the complexity of a system, which may occur in case where an operating frequency between a memory controller and a memory buffer chip is different from an operating frequency between the memory buffer chip and a memory chip, through a memory system including the memory buffer chip operating in an asynchronous manner.

Figure 2:
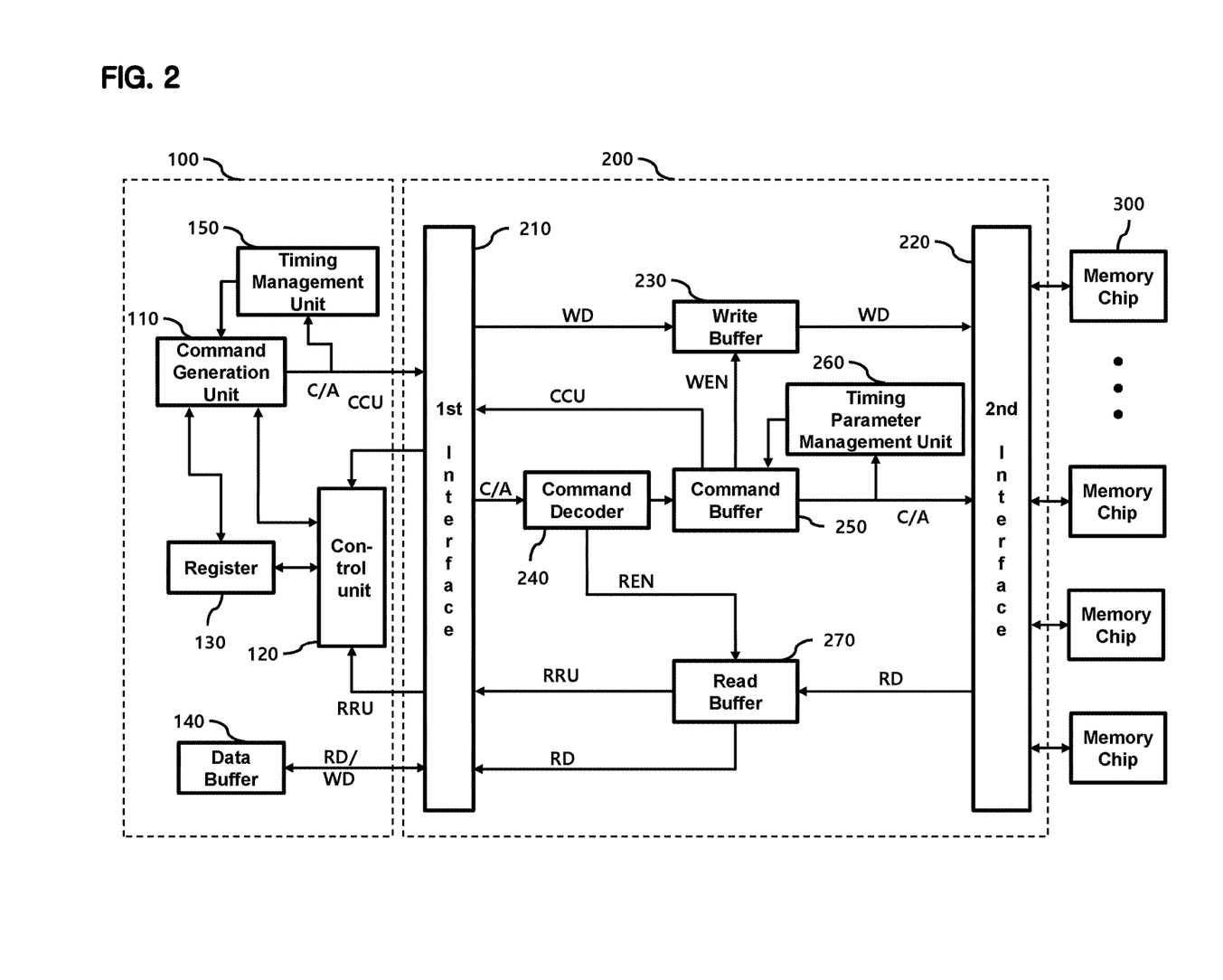
FIG. 2 is a block diagram illustrating a representation of an example of a memory system in accordance with an embodiment.

FIG. 2 is a block diagram illustrating a representation of an example of a memory system in accordance with an embodiment.

The memory system in accordance with a present embodiment may include a memory controller 100, a memory buffer chip 200 and a plurality of memory chips 300.

Referring to FIG. 2, the memory controller 100 may include a processor for performing a memory control function, for example, a CPU.

The memory controller 100 includes a command generation unit 110, a control unit 120, a register 130, a data buffer 140 and a timing management unit 150.

The command generation unit 110 generates a command and address corresponding to a read or write request, and provides the generated command and address to the memory buffer chip 200.

In a present embodiment a read command is divided into a first read command and a second read command.

The first read command is a read command for the memory chip 300.

The memory buffer chip 200 stores data in an internal read buffer thereof, the data being read through the first read command.

In a present embodiment, the second read command corresponds to a command for reading the data stored in the read buffer of the memory buffer chip 200.

In a present embodiment, the second read command is distinguishable from the first read command.

For example, when the DDR4 protocol is used, the A17 pin which is not used during a read command may be set to 0 for the first read command or 1 for the second read command.

The command generation unit 110 outputs a command by referring to the register 130.

The control unit 120 resets or updates the value of the register 130.

The register 130 stores a command credit, a read command credit, and a read response number.

In a present embodiment, the command credit is a value associated with the size of the command buffer of the memory buffer chip 200, and the command generation unit 110 outputs a command to the memory buffer chip 200 when the command credit is larger than 0. However, the second read command is not affected by the value of the command credit.

The read command credit is a value associated with the size of the read buffer of the memory buffer chip 200, and the command generation unit 110 outputs the first read command to the memory buffer chip 200 when the read command credit is larger than 0.

The read response number is a value associated with the number of read data RD which are read through the first read command and stored in the read buffer, and the command generation unit 110 outputs the second read command to the memory buffer chip 200 when the read response number is larger than 0.

The data buffer 140 stores write data WD which are to be provided to the memory buffer chip 200 and read data RD which are received from the memory buffer chip 200.

The timing management unit 150 checks whether a command to be outputted from the command generation unit 110 satisfies a timing condition.

In a present embodiment, when a second read command is outputted or a write command is outputted, the timing management unit 150 checks whether a data conflict can be avoided in a data bus between the data buffer 140 and the memory buffer chip 200.

When the timing management unit 150 determines that the timing condition is satisfied, the command generation unit 110 outputs a command/address to a first interface 210 of the memory buffer chip 200.

The memory buffer chip 200 includes the first interface 210, a second interface 220, a write buffer 230, a command decoder 240, a command buffer 250, a timing parameter management unit 260 and a read buffer 270.

The first interface 210 includes a physical circuit for transmitting and receiving a signal such as a command, an address or data to and from the memory controller 100.

In a present embodiment, the first interface 210 is operated in an asynchronous manner.

The second interface 220 may include a physical circuit for transmitting and receiving a signal such as a command, an address or data to and from a memory chip 300.

In a present embodiment, the second interface 220 may be operated in a synchronous manner, for example.

The write buffer 230 stores write data WD transmitted from the memory controller 100 through the first interface 210.

The write buffer 230 provides the write data WD to the second interface 220 according to a write enable signal WEN of the command buffer 250.

The command decoder 240 distinguishes a command transmitted from the memory controller 100 through the first interface 210.

In particular, the command decoder 240 distinguishes between the first and second read commands. In a present embodiment, the second read command may be referred to as a buffer read command.

When an input command is determined to be the second read command, the command decoder 240 may output a read enable signal REN for enabling the read buffer 270.

The command buffer 250 stores a command received from the command decoder 240. The command buffer 250 outputs a write enable signal WEN for controlling the write buffer 230.

When the number of commands buffered in the command buffer 250 is changed, the command buffer 250 provides a command credit update signal CCU to the control unit 120 of the memory controller 100 through the first interface 210.

For example, when the number of buffered commands decreases, the command buffer 250 provides the command credit update signal CCU to increase the command credit.

The command buffer 250 may buffer commands according to a FIFO (First-In First-Out) method.

The command buffer 250 outputs a command and address to the second interface 220 in consideration of the timing condition of the corresponding command, according to control of the timing parameter management unit 260.

The timing parameter management unit 260 may manage the timing condition according to a command corresponding to an order at which the command is to be outputted.

When the timing condition is satisfied, the timing parameter management unit 260 provides the corresponding command and address to the second interface 220.

For example, a timing condition for a synchronous semiconductor memory device may be expressed as the number of clocks.

In an embodiment, the timing parameter management unit 260 may include a plurality of counters of which the initial values are set according to the type of a command.

For example, when the command buffer 250 is intended to output a specific command, the timing parameter management unit 260 may inversely count a counter for the corresponding timing condition.

When the value becomes 0, the timing parameter management unit 260 may control a command and address to be provided to the second interface 220, the command and address being outputted from the command buffer 250.

FIG. 2 illustrates a command and address C/A signal.

Figure 3:
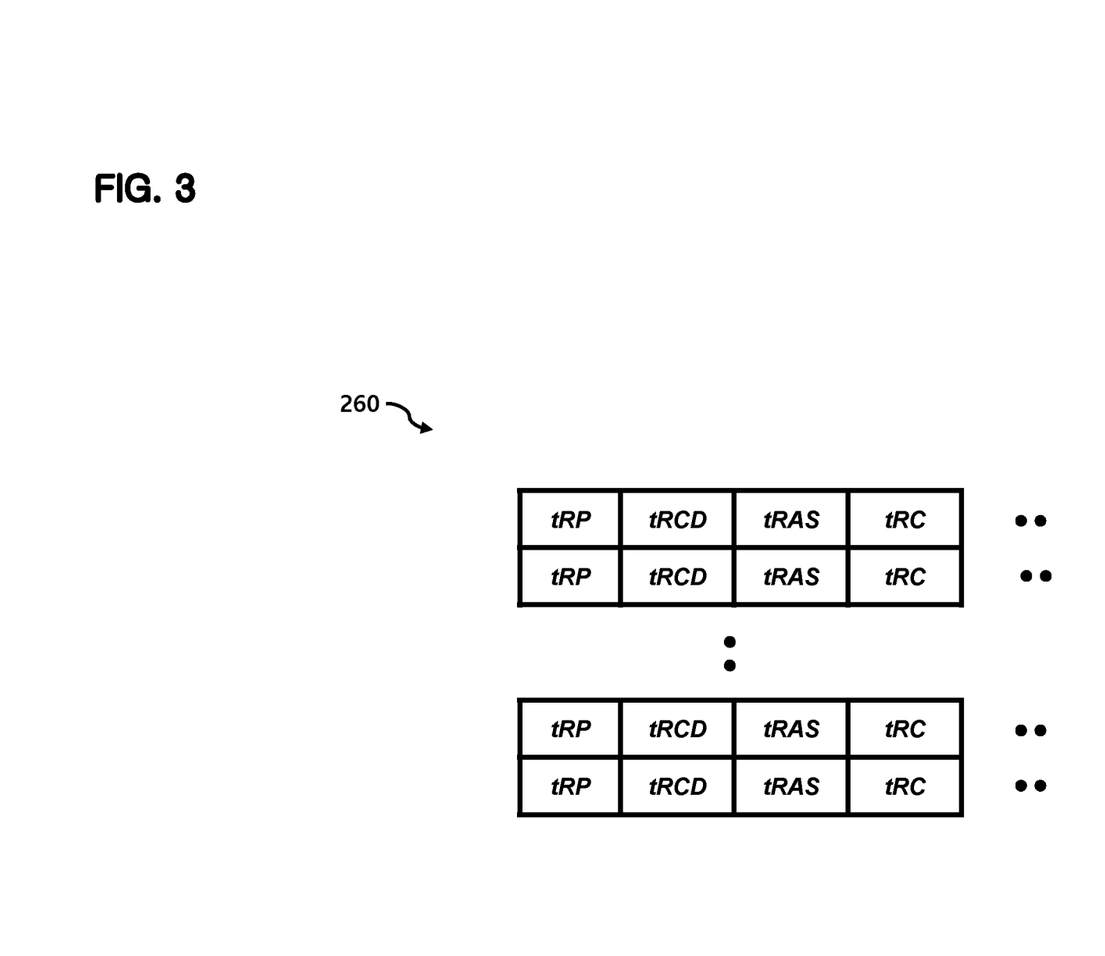
FIG. 3 is a representation of an example of block diagram of a timing parameter management unit of FIG. 2.

FIG. 3 illustrates a representation of an example of the configuration of the timing parameter management unit 260 in accordance with a present embodiment. The timing parameter management unit 260 may include counters corresponding to one or two or more timing conditions such as row precharge time tRP, row address to column address delay tRCD, row active time tRAS and row cycle time tRC, which are required according to a request.

The timing parameter management unit 260 may additionally manage the timing condition of the write enable signal WEN which is provided to the write buffer 230 in order to prevent a data conflict.

The read buffer 270 stores read data RD received from the memory chip 300 through the second interface 220.

The read buffer 270 provides the read data RD to the first interface 210 according to the read enable signal REN of the command decoder 240.

When the number of read data RD buffered in the read buffer 270 is changed, the read buffer 270 provides a read response number update signal RRU to the control unit 120 of the memory controller 100 through the first interface 210.

For example, when the number of buffered read data increases, the read buffer 270 provides the read response number update signal RRU to increase the read response number.

In a present embodiment, the case in which the memory chip 300 is a synchronous DRAM chip was taken as an example for description. However, the memory chip 300 is not limited thereto, but may include a new memory chip or media storage device which will be able to emerge in the future, as well as a media storage device including an existing memory chip.

In a present embodiment, the second interface 220 of the memory buffer chip 200 has a specification corresponding to the type of the memory chip 300.

In a present embodiment, the second interface 220 has a synchronous DRAM interface. However, when the memory chip 300 is a flash memory chip, the second interface 220 may have an interface for supporting the flash memory chip.

Figure 4:
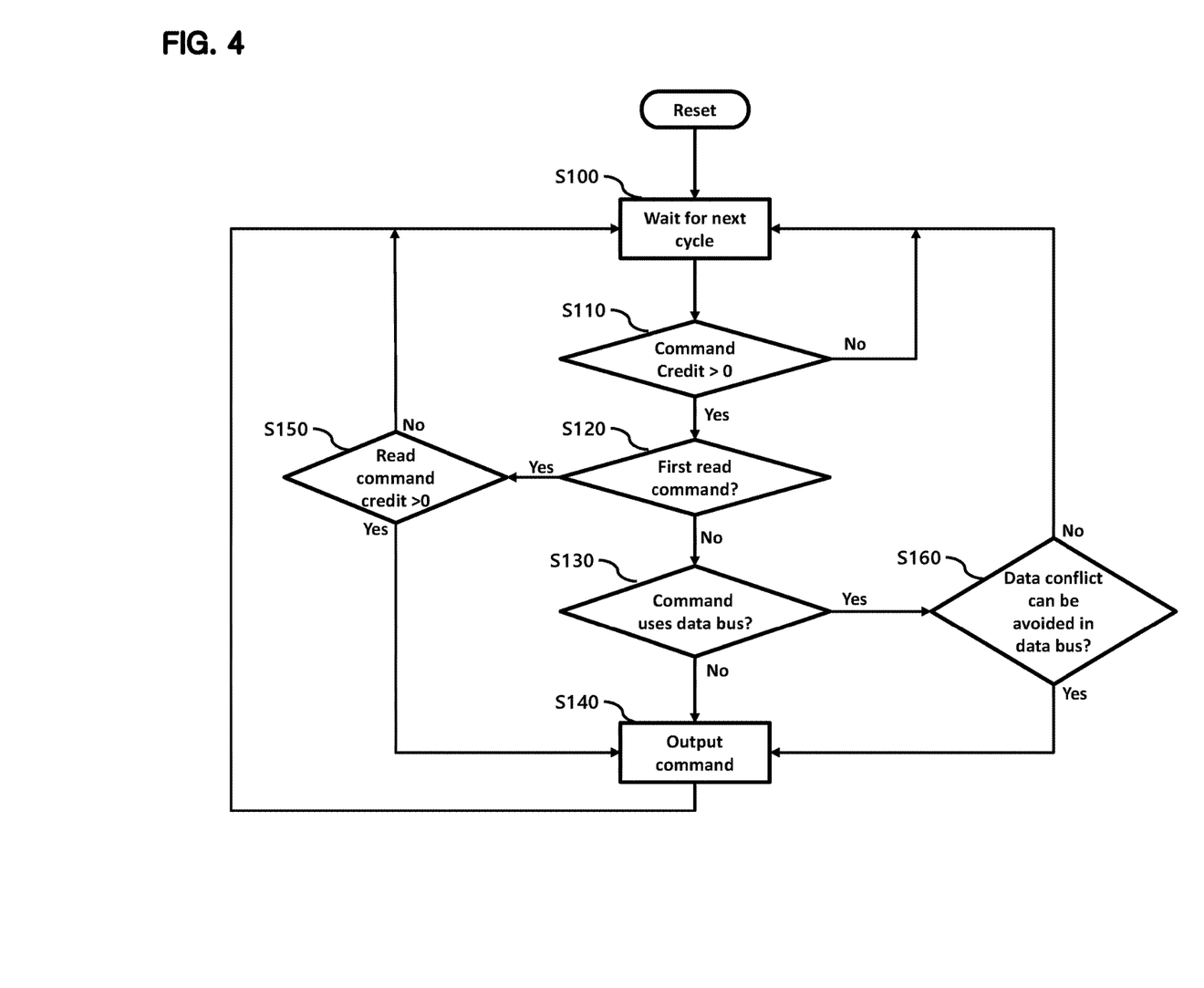
FIG. 4 is a flowchart illustrating a command output operation of a memory controller in accordance with a present embodiment.

FIG. 4 is a flowchart illustrating a command output operation of the memory controller in accordance with a present embodiment.

The operation of FIG. 4 may be performed by the command generation unit 110.

After the memory system is reset, the command generation unit 110 waits until the next cycle, at step S110.

Then, the command generation unit 110 checks whether the command credit is larger than 0, by referring to the register 130, at step S110.

When the command credit is not larger than 0, it may indicate that the command buffer 250 of the memory buffer chip 200 has no space. Thus, the command generation unit 110 does not output a command, but returns to step S100.

When the command credit is larger than 0, the command generation unit 110 checks whether a command is the first read command, at step S120.

When the command is the first read command, the command generation unit 110 checks whether the read command credit is larger than 0, at step S150.

When the read command credit is not larger than 0, it may indicate that the read buffer 270 of the memory buffer chip 200 has no space. Thus, the command generation unit 110 does not output the first read command, but returns to step S100.

When the read command credit is larger than 0, the command generation unit 110 outputs the command at step S140, and returns to step S100.

When it is checked at step S120 that the command is not the first read command, the command generation unit 110 determines whether the command uses the data bus, at step S130.

When the command does not use the data bus, the command generation unit 110 outputs the command at step S140, and returns to step S100.

When the command uses the data bus, the memory controller determines whether a data conflict of the data bus can be avoided, at step S160.

The determining of whether a data conflict of the data bus can be avoided may be performed by the timing management unit 150 of the memory controller.

When a data conflict cannot be avoided, the command generation unit 110 returns to the step S100, and when a data conflict can be avoided, the command generation unit 110 outputs the command at step S140, and returns to step S100.

Figure 5:
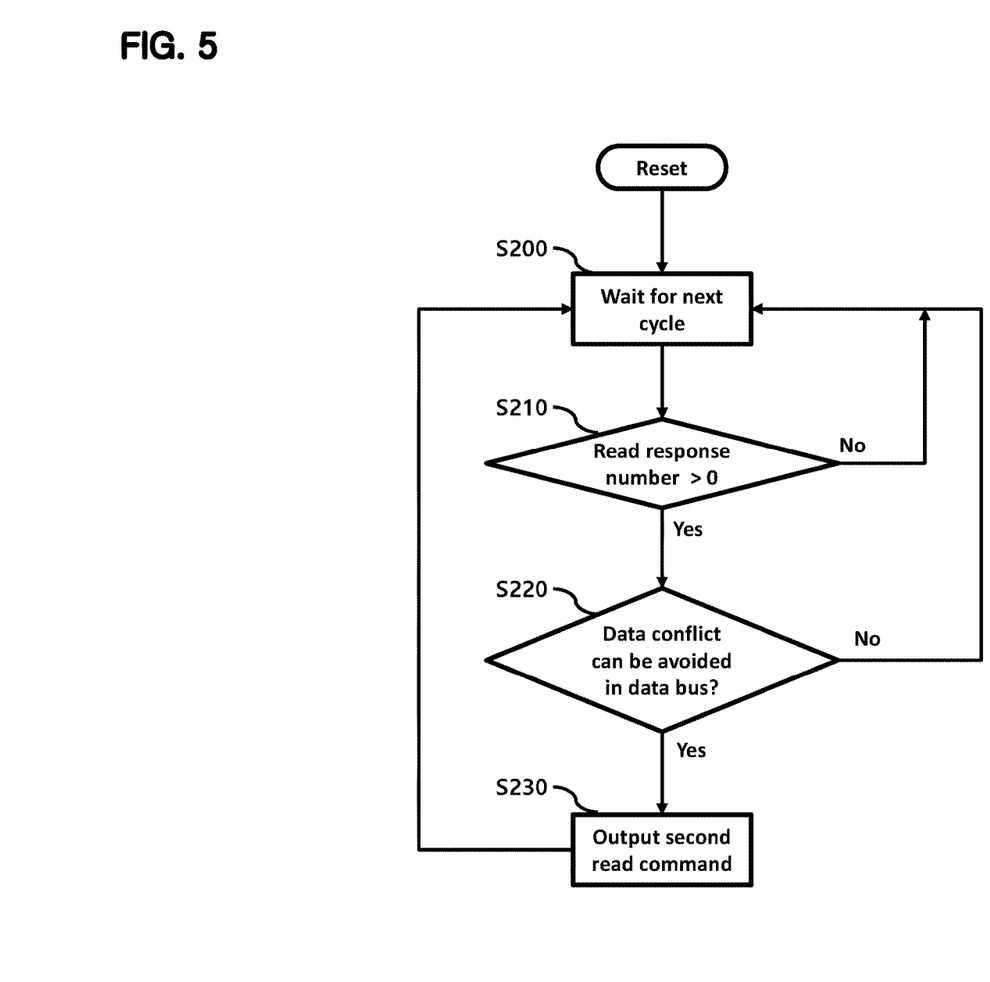
FIG. 5 is a flowchart illustrating a second read command output operation of the memory controller in accordance with a present embodiment.

FIG. 5 is a flowchart illustrating a second read command output operation of the memory controller in accordance with a present embodiment.

The operation of FIG. 5 may be performed by the command generation unit 110.

When the memory system is reset, the command generation unit 110 waits until the next cycle, at step S200.

Then, the command generation unit 110 determines whether the read response number is larger than 0, at step S210.

When the read response number is larger than 0, it may indicate that there exist data to be read from the read buffer 270 of the memory buffer chip 200.

When the read response number is not larger than 0, the command generation unit 110 returns to the step S200, and when the read response number is larger than 0, the command generation unit 110 proceeds to step S220 to determine whether a data conflict can be avoided in the data bus.

When a data conflict cannot be avoided, the command generation unit 110 returns to step S200, and when a data conflict can be avoided, the command generation unit 110 outputs the second read command at step S230.

Then, the command generation unit 110 proceeds to step S200 to repeat the above-described operation.

Figure 6:
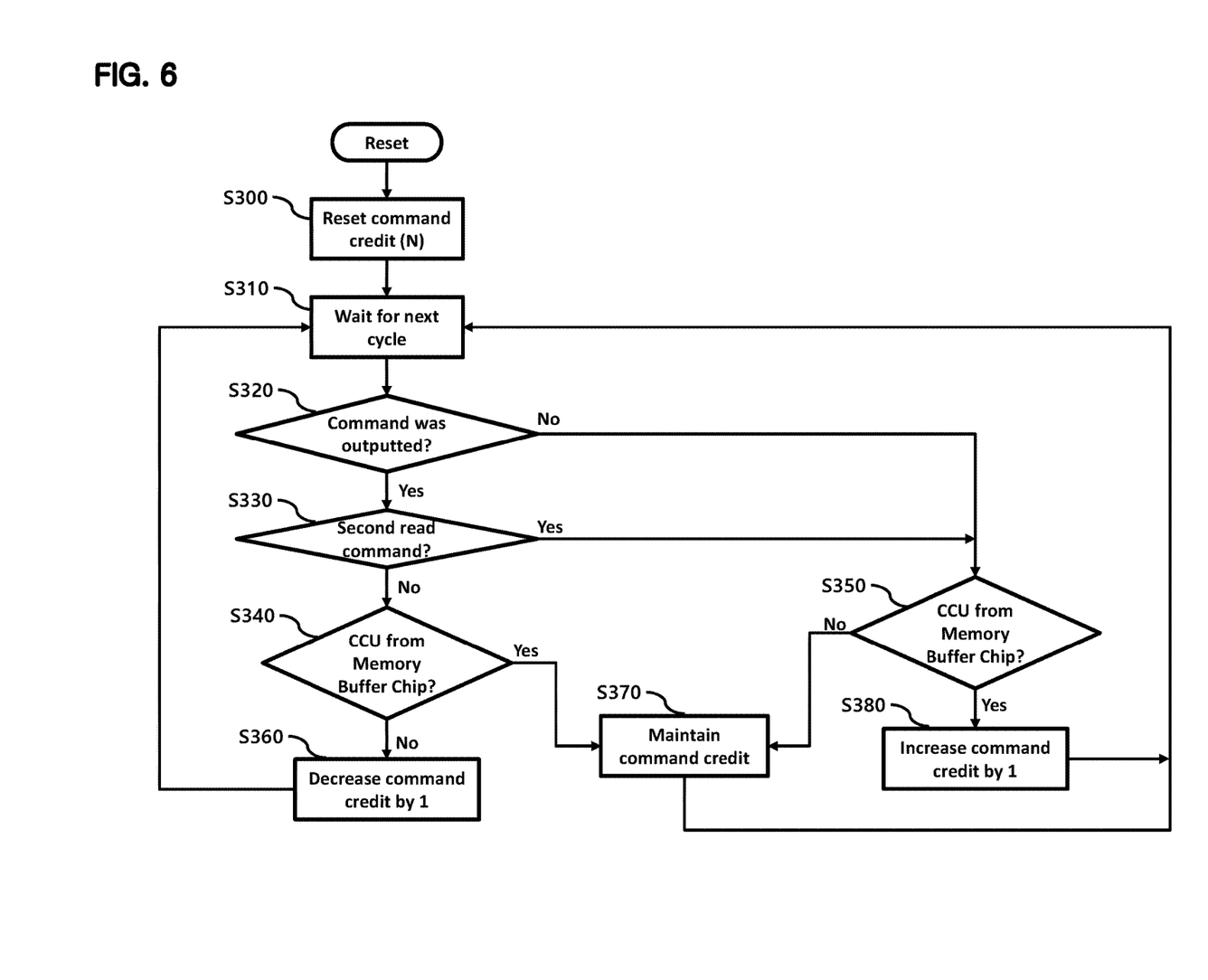
FIG. 6 is a flowchart illustrating a command credit control operation of the memory controller in accordance with a present embodiment.

FIG. 6 is a flowchart illustrating a command credit control operation of the memory controller in accordance with a present embodiment.

The operation of FIG. 6 may be performed by the control unit 120 with reference to the state of the command generation unit 110.

The operation of FIG. 6 may be performed under the supposition that whether to output the command in FIG. 4 and whether to output the second read command in FIG. 5 were determined.

When the memory system is reset, the control unit 120 resets the command credit to a value N larger than 0, at step S300.

Then, the control unit 120 waits until the next cycle, at step S310.

Then, the control unit 120 checks whether a command was outputted from the command generation unit 110, at step S320.

When the command was outputted, the control unit 120 checks whether the corresponding command is the second read command, that is, a buffer read command, at step S330.

Then, when the command is not the second read command, the control unit 120 checks whether the command credit update signal CCU was provided from the memory buffer chip 200, at step S340.

At this time, the command credit update signal CCU indicates that one of commands buffered in the command buffer 250 was outputted to the memory chip 300 through the second interface 220, and thus a command can be additionally provided.

Therefore, when the command credit update signal CCU was not provided, the control unit 120 decreases the command credit by 1 at step S360, and when the command credit update signal CCU was provided, the control unit 120 maintains the command credit at step S370.

When the command was not outputted at step S320 or the command is the second read command at step S330, the control unit 120 checks whether the command credit update signal CCU was provided from the memory buffer chip 200, at step S350.

Thus, when the command credit update signal CCU was not provided, the control unit 120 maintains the command credit at step S370, and when the command credit update signal CCU was provided, the control unit 120 increases the command credit by 1 at step S380.

After steps S360, S370 and S380, the control unit 120 returns to step S310 to repeat the above-described operation.

Figure 7:
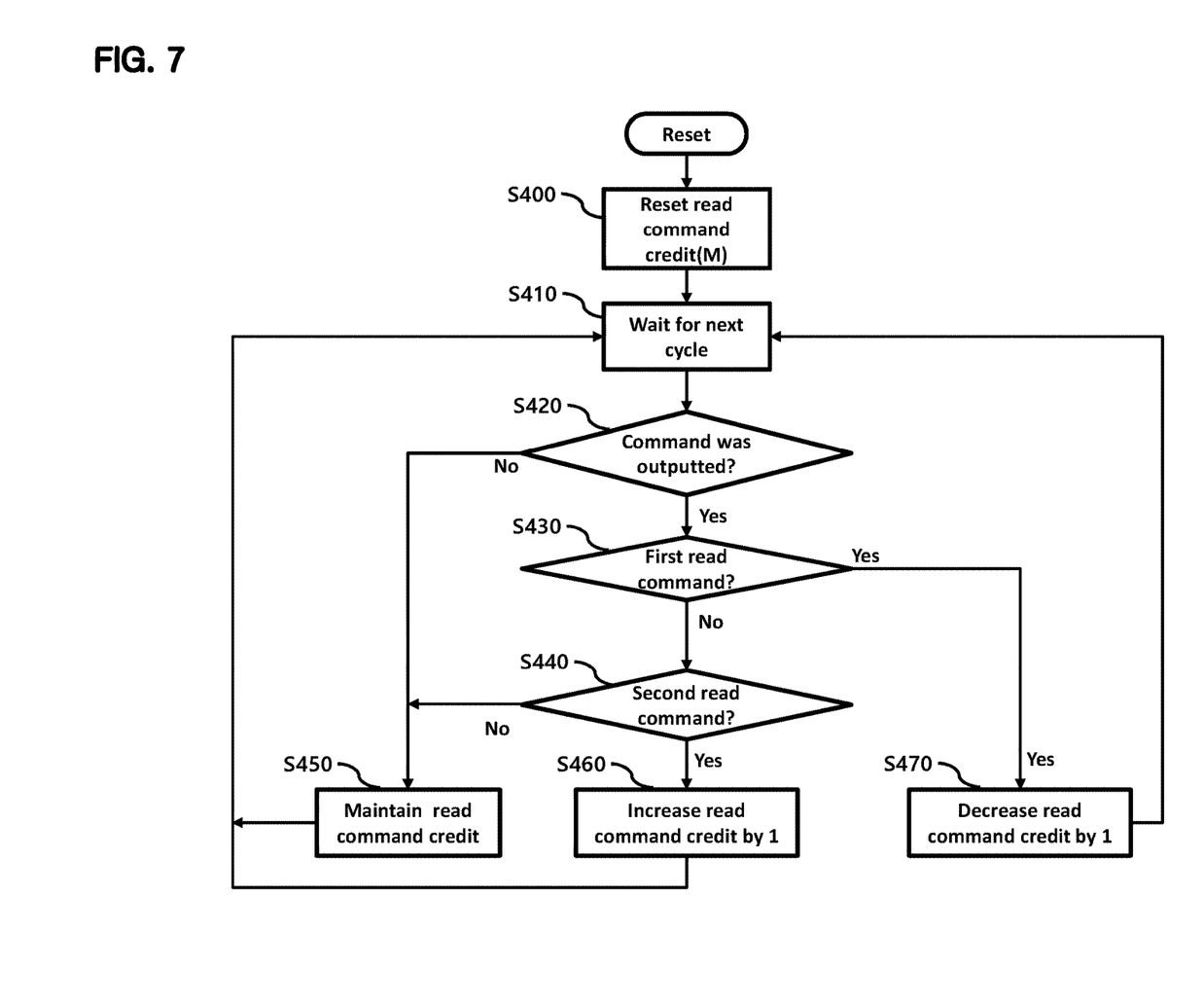
FIG. 7 is a flowchart illustrating a read command credit control operation of the memory controller in accordance with a present embodiment.

FIG. 7 is a flowchart illustrating a read command credit control operation of the memory controller in accordance with the present embodiment.

The operation of FIG. 7 may be performed by the control unit 120 with reference to the state of the command generation unit 110.

The operation of FIG. 7 may be performed under the supposition that whether to output the command in FIG. 4 and whether to output the second read command in FIG. 5 were determined.

When the memory system is reset, the control unit 120 resets the read command credit to a value M larger than 0, at step S400.

Then, the control unit 120 waits until the next cycle, at step S410.

Then, the control unit 120 checks whether a command was outputted from the command generation unit 110, at step S420.

When the command was not outputted, the control unit 120 maintains the read command credit at step S450, and returns to step S410.

When the command was outputted, the control unit 120 checks whether the corresponding command is the first read command, at step S430.

When the command is the first read command, the control unit 120 decreases the read command credit by 1 at step S470, and returns to step S410.

When the command is not the first read command, the memory controller checks whether the command is the second read command, at step S440.

When the command is the second read command, the control unit 120 increases the read command credit by 1 at step S460, and returns to step S410. On the other hand, when the command is not the second read command, the control unit 120 maintains the read command credit at step S450, and returns to step S410.

The control unit 120 may determine whether to output the first read command, by referring to the read command credit. Thus, when the first read command is continuously outputted, the control unit 120 can prevent an overflow which may occur in the read buffer 270 of the memory buffer chip 200.

Figure 8:
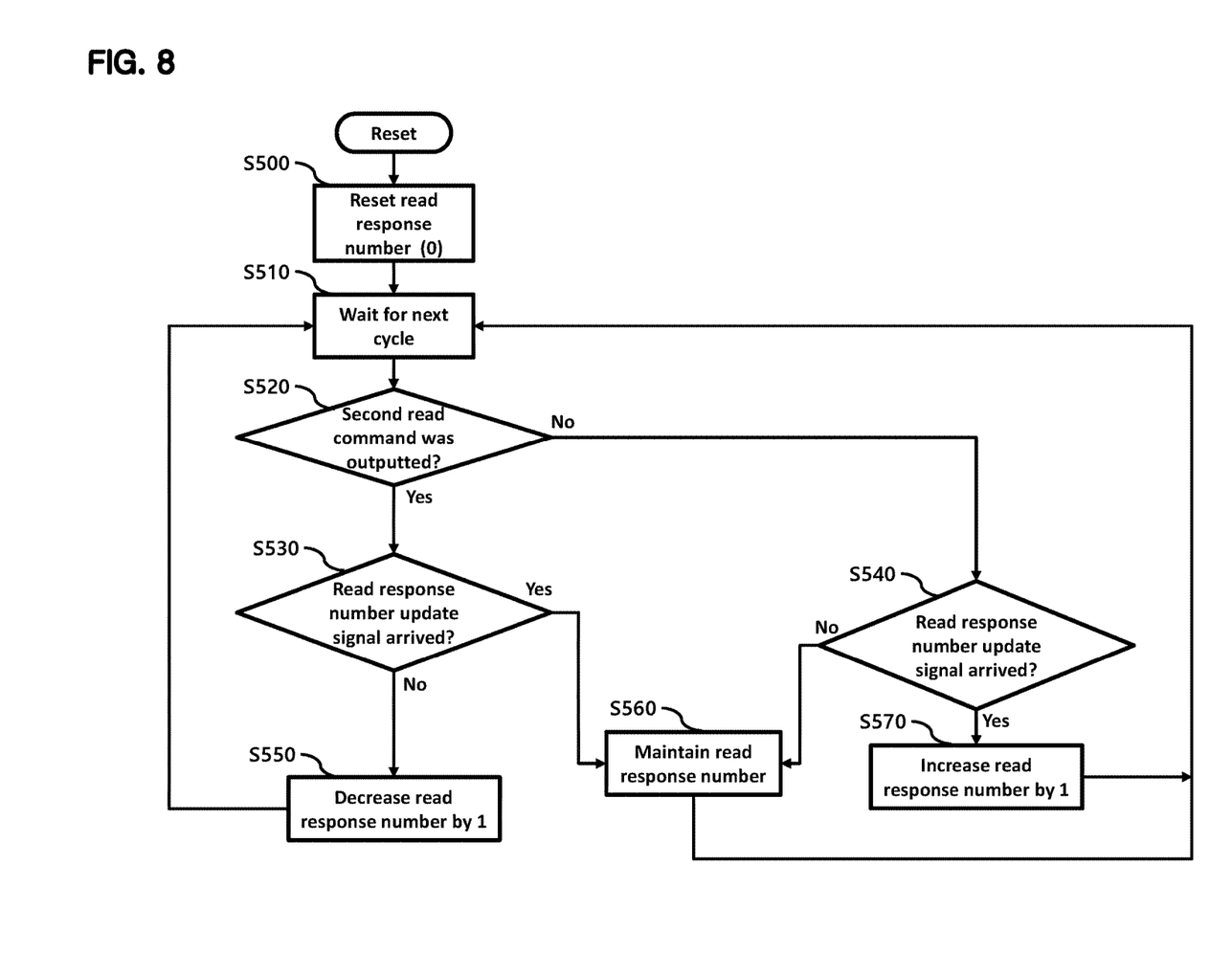
FIG. 8 is a flowchart illustrating a read response control operation of the memory controller in accordance with a present embodiment.

FIG. 8 is a flowchart illustrating a read response control operation of the memory controller in accordance with a present embodiment.

The operation of FIG. 8 may be performed by the control unit 120 with reference to the command generation unit 110.

The operation of FIG. 8 may be performed under the supposition that whether to output the second read command in FIG. 5 was determined.

When the memory system is reset, the control unit 120 resets the read response number to 0 at step S500.

Then, the control unit 120 waits until the next cycle, at step S510.

Then, the control unit 120 determines whether the second read command was outputted, at step S520.

When the second read command was outputted, the control unit 120 determines whether the read response number update signal RRU arrived from the memory buffer chip 200, at step S530.

When the read response number update signal arrived in a state where the second read command was outputted, it may indicate that the available space of the read buffer 270 was not changed. Thus, the control unit 120 maintains the read response number at step S560. On the other hand, when the read response number update signal did not arrive, it may indicate the available space of the read buffer 270 was reduced. Thus, the control unit 120 decreases the read response number by 1 at step S550.

When a command other than the second read command was outputted at step S520, the control unit 120 determines whether the read response number update signal arrived, at step S540.

When the read response number update signal arrived, the control unit 120 increases the read response number by 1 at step S570. Otherwise, the control unit 120 maintains the read response number at step S560.

After performing steps S550, S560 and S570, the control unit 120 returns to step S510 to repeat the above-described operation.

Figure 9:
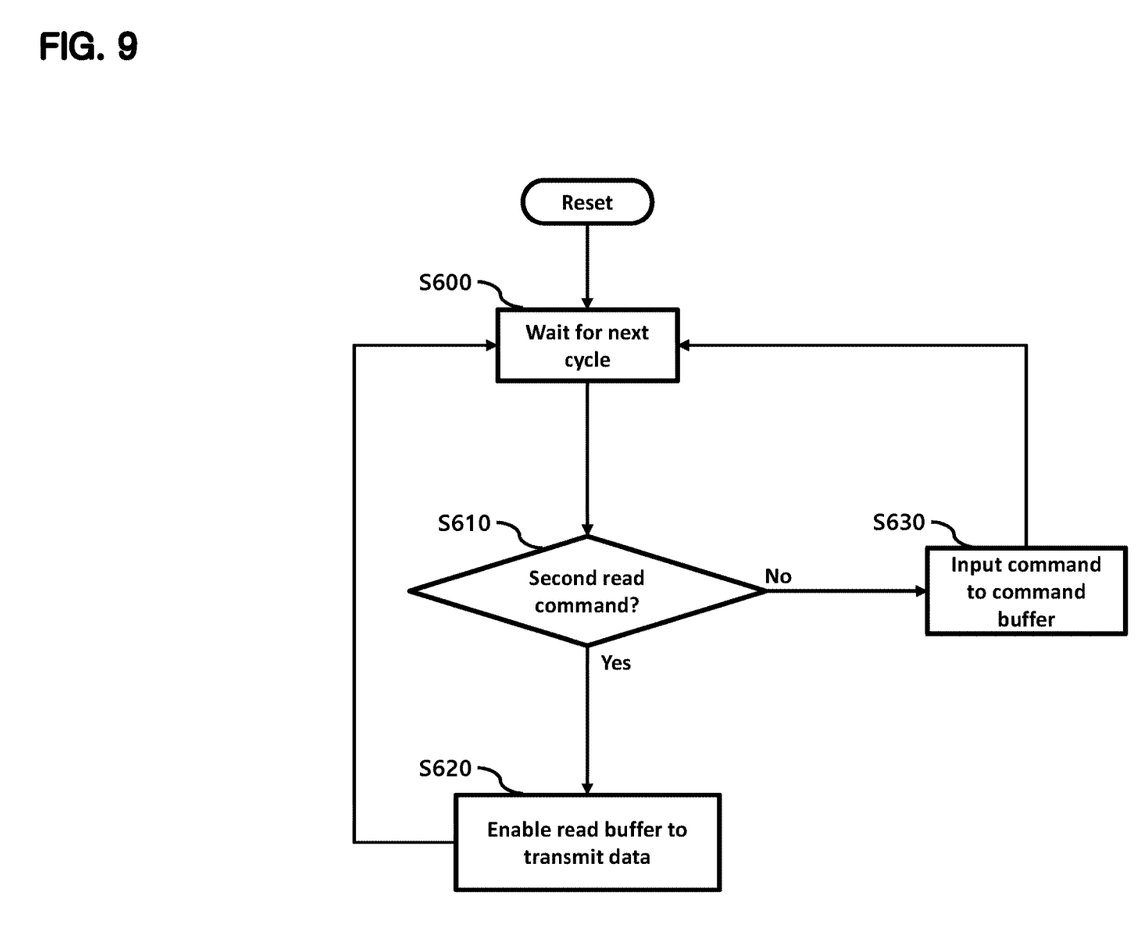
FIG. 9 is a flowchart illustrating a command decoding operation of a memory buffer chip in accordance with a present embodiment.

FIG. 9 is a flowchart illustrating a command decoding operation of the memory buffer chip in accordance with a present embodiment.

The operation of FIG. 9 may be performed by the command decoder 240 of the memory buffer chip 200.

When the memory system is reset, the command decoder 240 waits until the next cycle at step S600, and determines whether a command is the second read command, that is, a buffer read command, at step S610.

When the command is not the second read command, the command decoder 240 inputs the command to the command buffer at step S630, and returns to step S600.

When the command is the second read command, the command decoder 240 enables a read enable signal REN to provide data of the read buffer 270 to the memory controller 100 through the first interface 210, at step S620.

Then, the command decoder 240 returns to step S600 to repeat the above-described operation.

Figure 10:
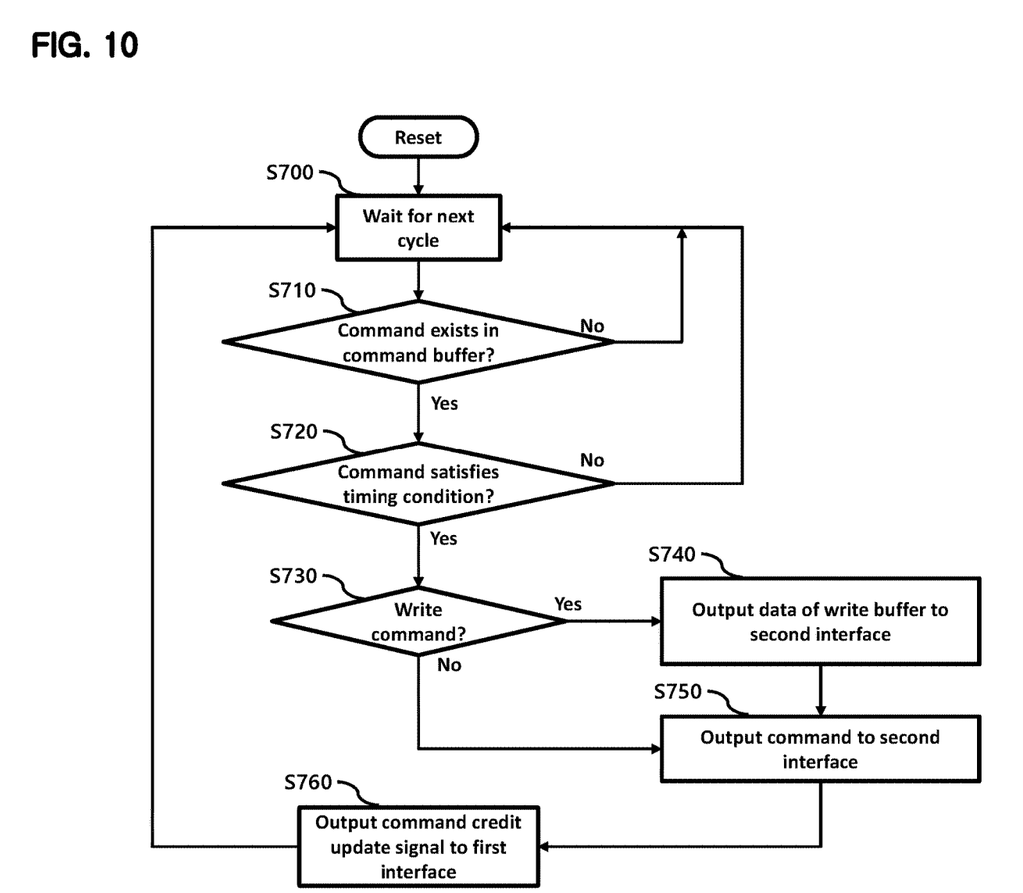
FIG. 10 is a flowchart illustrating a command output operation of the memory buffer chip in accordance with a present embodiment.

FIG. 10 is a flowchart illustrating a command output operation of the memory buffer chip in accordance with a present embodiment.

The operation of FIG. 10 may be performed by the command buffer 250 of the memory buffer chip 200.

When the memory system is reset, the command buffer 250 waits until the next cycle, at step S700.

Then, the command buffer 250 determines whether a command exists in the command buffer, at step S710.

When no commands exist, the command buffer 250 returns to step S700, and when a command exists, the command buffer 250 determines whether the command satisfies a timing condition, at step S720.

The command buffer 250 determines whether the command satisfies the timing condition, by referring to the timing parameter management unit 260.

When the command does not satisfy the timing condition, the command buffer 250 returns to step S700, and when the command satisfies the timing condition, the command buffer 250 determines whether the command is a write command, at step S730.

When the command is a write command, the command buffer 250 enables the write enable signal WEN to output data of the write buffer 230 to the second interface, at step S740.

Then, the command buffer 250 outputs the command to the second interface 220.

When the command is not a write command at step S730, the command buffer 250 outputs the command to the second interface at step S750.

Then, the command buffer 250 outputs the command credit update signal CCU to the first interface 210 at step S760, such that the control unit 120 increases the command credit.

Then, the command buffer 250 returns to step S700 to repeat the above-described operation.

Figure 11:
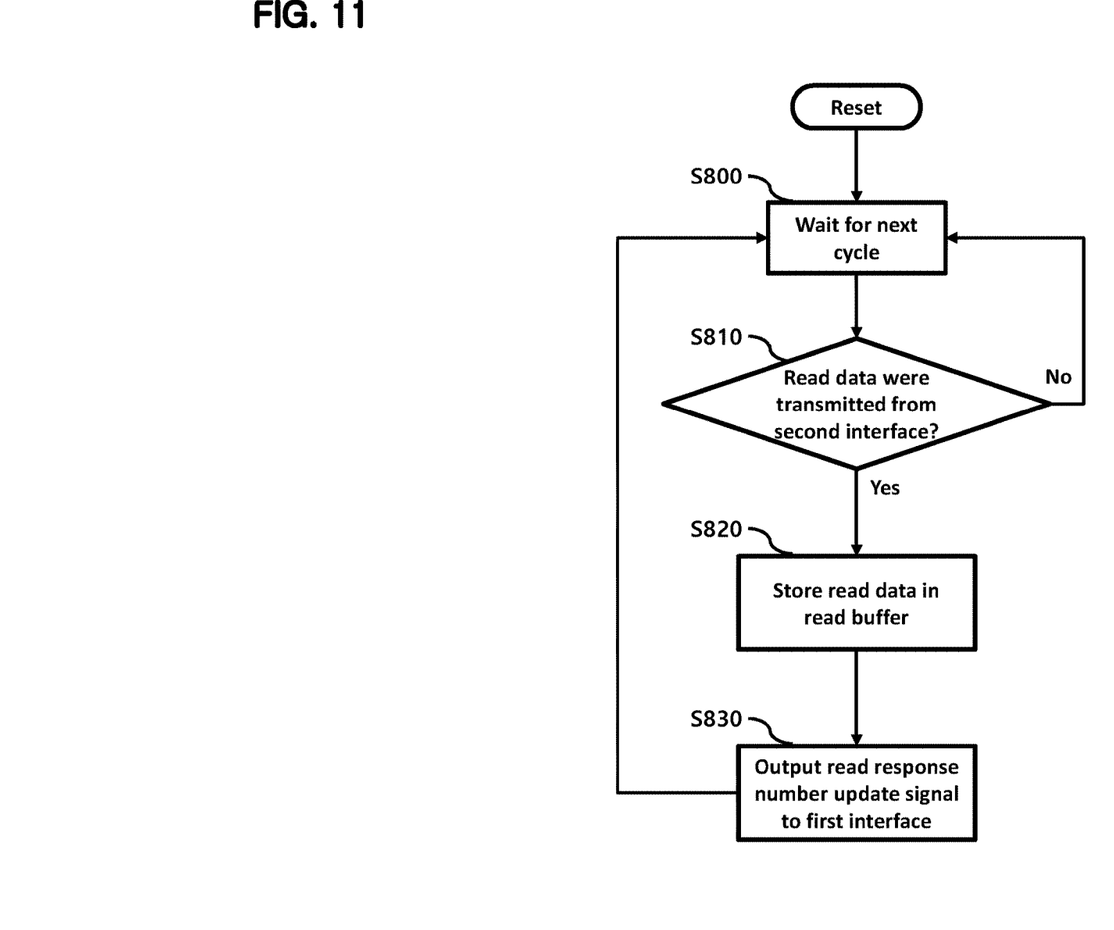
FIG. 11 is a flowchart illustrating a read data receiving operation of the memory buffer chip in accordance with a present embodiment.

FIG. 11 is a flowchart illustrating a read data receiving operation of the memory buffer chip in accordance with a present embodiment.

The operation of FIG. 11 may be performed by the read buffer 270 of the memory buffer chip.

When the memory system is reset, the read buffer 270 waits till the next cycle, at step S800.

Then, the read buffer 270 checks whether read data were transmitted from the second interface 220, at step S810.

When read data were not transmitted, the read buffer 270 returns to step S800.

When read data were transmitted, the read buffer 270 stores the read data therein at step S820.

Then, the read buffer 270 outputs the read response number update signal to the first interface 210 at step S830, such that the control unit 120 increases the read response number.

Then, the read buffer 270 returns to step S800 to repeat the above-described operation.

In a present embodiment, the read command includes the first read command for reading data of the memory chip 300 into the read buffer 270 and the second read command for reading data of the read buffer 270 into the data buffer 140, and the second read command is performed in an asynchronous manner.

Furthermore, the read buffer 270 of the memory buffer chip 200 may have a data structure based on the FIFO method.

In this case, the command generation unit 110 may refer to the output history of the first read command and the value of the read response number, and easily determine to which first read command the currently outputted second read command corresponds.

In accordance with present embodiments, the memory controller of the memory system outputs a command through asynchronous control regardless of the operating speed of the memory chip. Thus, the design may be simplified.

Since the memory system is operated in an asynchronous manner, the memory system is suitable for controlling a memory chip having long latency.

The memory system can easily deal with a situation in which latency is changed. Although the type of a memory chip is changed, the design of the memory controller does not need to be significantly changed.

The memory system can use a conventional DIMM channel as it is, and does not require a number of pins for additional control.

Although various embodiments have been described for illustrative purposes, it will be apparent to those skilled in the art that various changes and modifications may be made without departing from the spirit and scope of the disclosure as defined in the following claims.

What is claimed is:

1. A memory controller which controls a memory buffer chip coupled to one or more memory chips, comprising:
   a command generation unit configured to generate a command which is provided to the memory buffer chip;
   a data buffer configured to store data which are to be transmitted to or received from the memory buffer chip;
   a register configured to store command credit information and read response number information, wherein the command credit information is updated according to an available size of a command buffer of the memory buffer chip, and wherein the read response number information is updated to a value associated with a number of data stored in a read buffer of the memory buffer chip; and
   a control unit configured to control the register according to a command credit update signal and/or a read response number update signal received from the memory buffer chip,
   wherein the command generation unit determines whether to output the command to the memory buffer chip according to the command credit information.

2. The memory controller of claim 1, wherein the control unit decreases the command credit information based on the command generation unit outputting a command.

3. The memory controller of claim 1, wherein the control unit increases the command credit information based on the command credit update signal being received.

4. The memory controller of claim 1, wherein the command comprises a read command and a write command, and
   the read command comprises a first read command for reading data read from a memory chip and storing the read data in the read buffer and a second read command for reading data of the read buffer and storing the read data in the data buffer,
   wherein the control unit outputs the second read command after outputting the first read command.

5. The memory controller of claim 4,
   wherein the command generation unit outputs the second read command according to the read response number information.

6. The memory controller of claim 5, wherein the control unit decreases the read response number information based on the command generation unit outputting the second read command.

7. The memory controller of claim 1, wherein the control unit increases the read response number information based on the read response number update signal being received.

8. The memory controller of claim 5, wherein the register further stores read command credit information which is updated to a value associated with the size of the read buffer, and
   the command generation unit outputs the first read command according to the read command credit information.

9. The memory controller of claim 8, wherein the control unit decreases the read command credit information based on the command generation unit outputting the first read command, and increases the read command credit information based on the command generation unit outputting the second read command.

* * * * *